United States Patent [19]
Miyatake et al.

[11] Patent Number: 4,719,352
[45] Date of Patent: Jan. 12, 1988

[54] APPARATUS FOR INTERMITTING BEAM OF LIGHT FOR USE IN GAS ANALYZER

[75] Inventors: Kimio Miyatake; Kenji Takeda, both of Kyoto, Japan

[73] Assignee: Horiba, Ltd., Kyoto, Japan

[21] Appl. No.: 844,017

[22] Filed: Mar. 25, 1986

[30] Foreign Application Priority Data

Jun. 4, 1985 [JP] Japan .............. 60-85106[U]

[51] Int. Cl.⁴ ........................... G02B 26/04
[52] U.S. Cl. .................. 250/351; 250/343; 250/345; 250/350; 350/274; 384/517; 384/518
[58] Field of Search .............. 250/351, 350, 343, 345; 384/225, 224, 518, 517; 350/274

[56] References Cited

U.S. PATENT DOCUMENTS 3,781,910 12/1973 Herrmann ............... 250/341
4,116,506 9/1978 Moritomo et al. ........... 384/518

FOREIGN PATENT DOCUMENTS 2100367 12/1982 United Kingdom ........... 384/518

Primary Examiner—Janice A. Howell
Assistant Examiner—Constantine Hannaher
Attorney, Agent, or Firm—Wenderoth, Lind & Ponack

[57] ABSTRACT

An apparatus for intermitting beams of light for use in a gas analyzer in which a rotary shaft of a chopper is supported by first and second ball bearings. An outside ring of the first ball bearing is fixedly mounted on a bearing housing and either an inside ring or an outside ring of the second ball bearing is adapted to be movable in the thrust or axial direction relative to the rotary shaft, whereby the second ball bearing is movably energized in the thrust direction by an elastic member to eliminate shake of the rotary shaft due to play in the ball bearings and thus reduce modulation noise to improve measuring accuracy of the gas analyzer.

14 Claims, 10 Drawing Figures

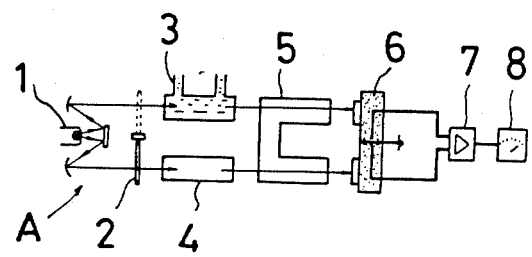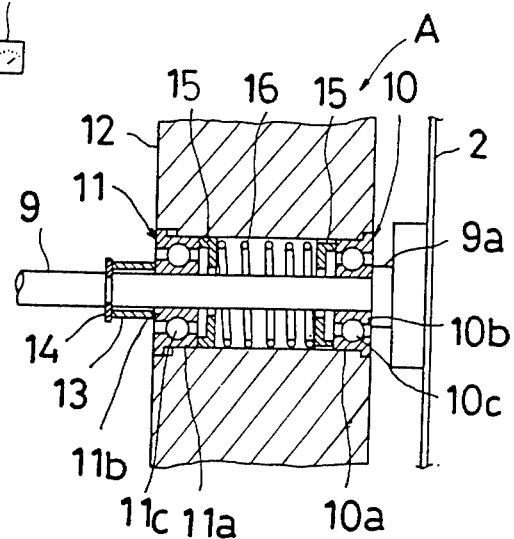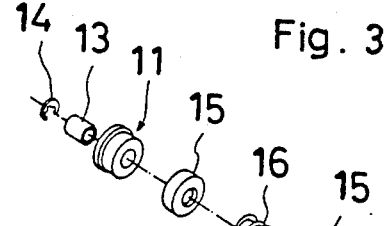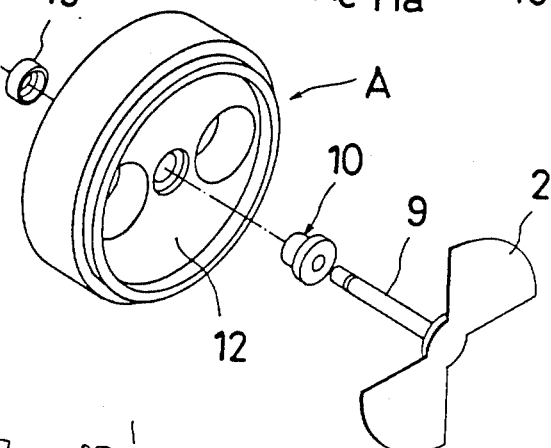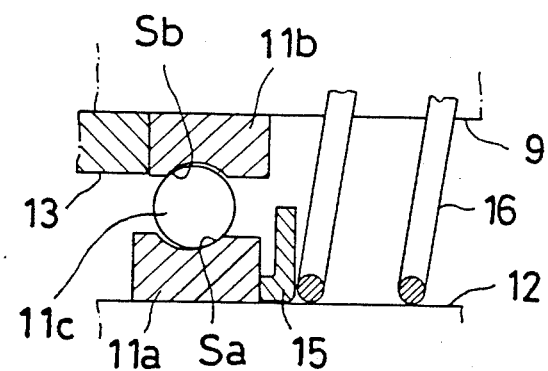

APPARATUS FOR INTERMITTING BEAM OF LIGHT FOR USE IN GAS ANALYZER

BACKGROUND OF THE INVENTION

1. Field of the Invention

The present invention relates to an apparatus for intermitting a beam bundle such as a sample beam bundle and a reference beam bundle in a gas analyzer such as a nondispersive infrared gas analyzer.

2. Description of the Prior Art

An apparatus for intermitting beams of light for use in a gas analyzer A, in which two ball bearings 10, 11 support a rotary shaft 9 of a chopper 2, as shown in FIG. 9, has been known. 10a, 11a designate outside rings fixedly mounted on a bearing housing 12 by means of adhesives and the like. 10b, 11b designate inside rings, both the inside rings 10b, 11b being prevented from moving axially outward relative to the rotary shaft 9 by a larger-diameter portion 9a of the rotary shaft 9, a fixing spacer 13 and a fixing ring 14.

For example, in an infrared gas analyzer, in general a quantity of a beam of light incident upon a sample cell and that incident upon a reference cell are balanced, an alternative electric signal being taken out by intermitting the beam bundle by a chopper, and the alternative electric signal being converted into a gas-concentration signal. In this case, if a bearing of the chopper has any play in the thrust direction or the radial direction, this play appears in the form of shake x of a shaft of the chopper 1, as shown in FIG. 10, and as a result, a difference is produced between the quantity of a beam of light incident upon the cell 3 and that incident upon the cell 4 and becomes a noise which reduces measuring accuracy. Accordingly, a precision ball bearing has been used for said ball bearings 10, 11 in many cases. However, even in this case, there is a clearance of several microns between outside rings as well as inside rings and balls 10c, 11c. This minute clearance leads to a shake of a shaft of the chopper 2 which leads to a noise.

SUMMARY OF THE INVENTION

The present invention aims at the elimination of the above described disadvantages of an apparatus for intermitting beams of light for use in a gas analyzer and the provision of an apparatus for intermitting beams of light for use in a gas analyzer in which a modulation noise generated due to a shake of a shaft of a chopper when a beam bundle is intermitted is reduced.

In order to achieve the above described object, the present invention is characterized in that a rotary shaft of a chopper is supported by first and second ball bearings, an outside ring of the first ball bearing is fixedly mounted on a bearing housing and a movable ring comprising an outside ring or an inside ring of the second ball bearing is movable in the thrust or axial direction relative to said bearing housing or the rotary shaft and movably energized by means of an elastic member in the thrust direction.

With the above described construction, pressure in the thrust direction due to the elastic member is always given to the movable ring of the second ball bearing, whereby said movable ring is maintained so as to be biassed in the thrust direction relative to a stationary ring comprising an inside ring or outside ring opposite to said movable ring. Also, the pressure in the thrust direction due to the elastic member is transmitted to the inside ring of said first ball bearing through the rotary shaft, and the inside ring and outside ring of said first ball bearing are maintained so as to be biassed against each other. Furthermore, since a ball-receiving surface of each of the inside rings and outside rings is recessed in a spherical shape, the ball is maintained so as to be pressed against opposite sides of the recessed portion of the inside rings and outside rings, whereby play in the thrust direction and radial direction between the recessed surface of the inside rings and outside rings and the balls can be eliminated.

Accordingly, shake of a shaft of a chopper is eliminated, whereby a modulation noise generated when a beam bundle is intermitted can be reduced and the measuring accuracy can be improved.

BRIEF DESCRIPTION OF THE DRAWINGS

FIG. 1 is a general block diagram showing an example of a non-dispersive infrared gas analyzer;

FIG. 2 is a sectional view showing a bearing structure according to the present invention of an apparatus for intermitting beams of light;

FIG. 3 is a perspective view showing a disassembled bearing structure of the apparatus for intermitting beams of light shown in FIG. 2;

FIG. 4 is an enlarged sectional view showing the principal parts of one bearing shown in FIG. 2;

DESCRIPTION OF THE PREFERRED EMBODIMENTS

Figure 5:
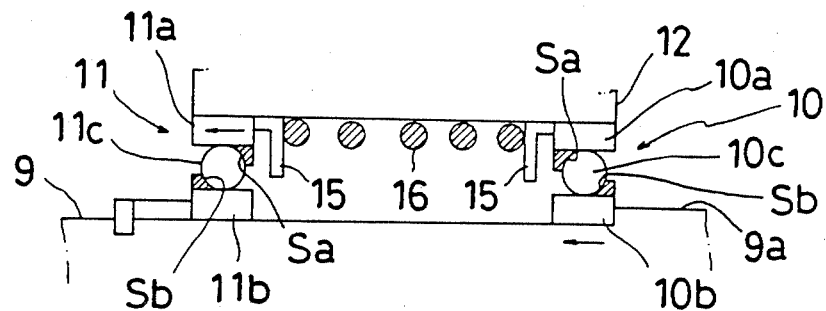
FIG. 5 is a general block diagram showing a bearing structure of the apparatus for intermitting beams of light shown in FIG. 2.

The preferred embodiments of the present invention will be described below with reference to the drawings.

Referring now to FIG. 1 which is a general block diagram showing one example of a non-dispersive infrared gas analyzer A, 1 designates a source of light, 2 a chopper of an apparatus for intermitting beams of light, 3 a sample cell, 4 a reference cell, 5 an interference filter cell, 6 a condenser microphone detector, 7 an amplifier, and 8 an indicator.

Referring to FIGS. 2 to 5 showing a bearing structure according to a first preferred embodiment of the present invention for an apparatus for intermitting beams of light, 9 designates a rotary shaft of the chopper 2 driven by a motor (not shown) and supported by first and second ball bearings 10, 11. An outside ring 10a of the first ball bearing 10 disposed on the chopper 2 side is fixedly mounted on a bearing housing 12 by means of adhesives and the like so that the movement of an inside ring 10b axially toward the chopper 2 side can be prevented by a larger-diameter portion 9a of the rotary shaft 9. A movable outside ring 11a of the second ball bearing 11 is inserted in the bearing housing movably in the axial or thrust direction. The movement of a stationary inside ring 11b of the second ball bearing 11 axially away from the first ball bearing 10 (in the direction away from the chopper 2) is prevented by a fixing spacer 13 and a fixing ring 14.

Also, biasing means comprising a pair of spring seats 15, 15, which are engaged between radially extending inner sides of the outside rings 10a, 11a respectively and a coil spring 16, which is compressed between the spring seats 15, 15, is provided between the first and second ball bearings 10, 11 to movably energize the movable outside ring 11a axially outward in a direction away from the opposite outside ring 11a. Instead of said spring 16, a rubber member may be used as an elastic member.

Next, the operation of an apparatus for intermitting beams of light constructed in the above described manner will be described with reference to FIGS. 4 and 5.

Since the outside ring 10a of the first ball bearing 10 is fixedly mounted on the bearing housing 12, the outside ring 11a of the second ball bearing 11 is pressed axially outward by the pressure of the spring 16, whereby the balls 11c are biassed toward the inside ring 11b, as shown in FIG. 4, and as a result, each ball 11c is pressed by a portion Sa of the recessed surface of the outside ring 11a located closest to the spring seat 15 so that a portion Sb of the recessed surface of the inside ring 11b located furthest from the spring seat 15 may be pressed by the ball 11c, whereby the clearance in the thrust direction and in the radial direction becomes remarkably small.

Also, since the axially outward movement of the inside stationary ring 11b relative to the rotary shaft 9 is prevented by the fixing spacer 13 and the fixing ring 14, the rotary shaft 9 is pressed leftward as seen in FIG. 5 and the inside ring 10b of the first ball bearing 10 is pressed by the larger-diameter portion 9a of the rotary shaft 9, as shown in FIG. 5, so that the recessed surface portion Sa of the outside ring 10a located closest to the spring seat 15, the ball 10c and the recessed surface Sb of the inside ring 10b located furthest from the spring seat 15 are pressed to each other, whereby the clearance in the thrust direction and in the radial direction becomes remarkably small.

Accordingly, the shake of the shaft of the chopper 2 due to a play in the ball bearings 10, 11 can be eliminated and a modulation noise generated when a beam of light is intermitted can be reduced, whereby the measuring accuracy can be improved.

Figure 6:
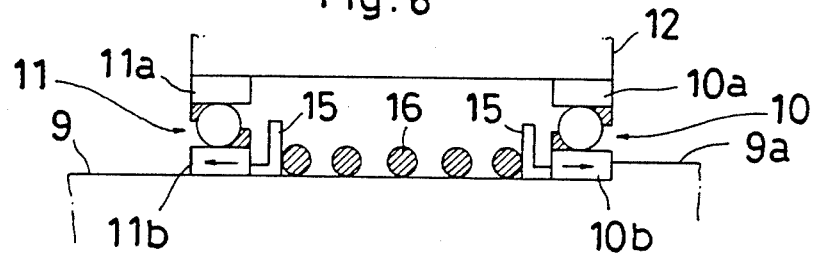
FIGS. 6 to 8 are general block diagrams showing other embodiments of the present invention, respectively.
Figure 7:
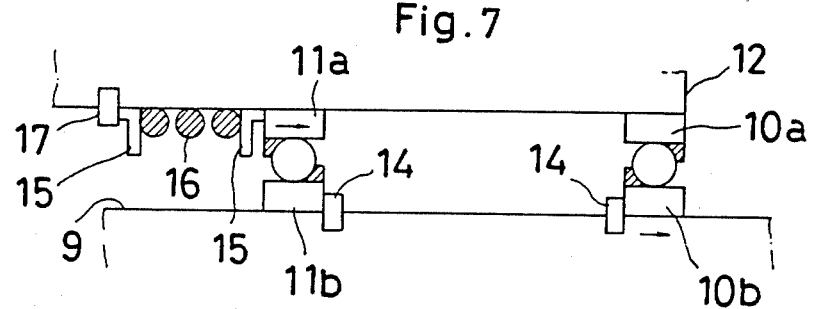
Figure 8:
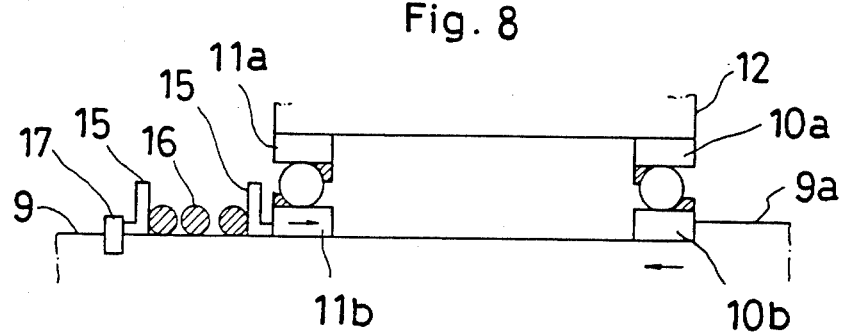
Figure 9:
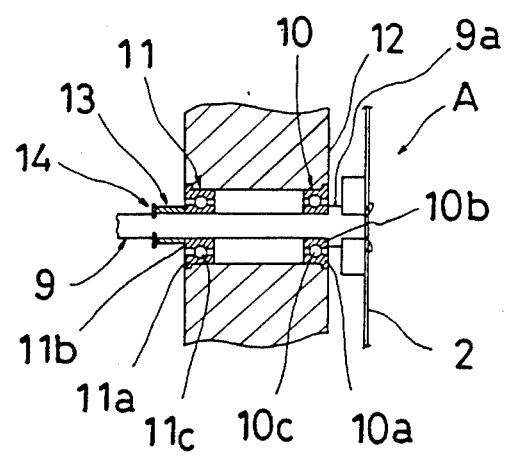
FIGS. 9 and 10 are a cross-sectional view and an end view of a conventional apparatus, respectively.
Figure 10:
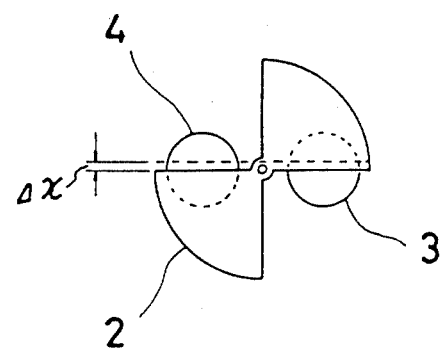

FIGS. 6 to 8 show other embodiments of the present invention.

The second preferred embodiment shown in FIG. 6 is characterized in that the outside rings 10a, 11a of both ball bearings 10, 11 are fixedly mounted on a bearing housing, the movement of a movable inside ring 10b of a first ball bearing 10 in one direction relative to a rotary shaft 9 being prevented by a larger-diameter portion 9a, a movable inside ring 11b of the second ball bearing 11 being movable in the axial or thrust direction, and biasing means comprising spring seats 15, 15, which are engaged between radially extending inner sides of the inside rings 10b, 11b, and a coil spring 16, which is compressed between the spring seats 15, 15, is provided between both inside rings 10b, 11b, whereby the movable inside ring 11b is movably energized outward away from the opposite inside ring 11a.

The third preferred embodiment shown in FIG. 7 is characterized in that a movable outside ring 11a, which is adapted to be movable in the axial or thrust direction, is pressed toward the opposite outside ring 10a from outside by a coil spring 16 inserted between said outside ring 11a and a bearing housing 12. The inward movement of inside rings 10b, 11b relative to a rotary shaft 9 is prevented by fixing rings 14, 14 and the like. 17 designates a fixing ring attached to the housing 12 for preventing the spring seat 15 located furthest from the movable outside ring 11a from moving axially outward away from the movable outside ring 11a.

The fourth preferred embodiment shown in FIG. 8 is characterized in that a movable inside ring 11b, which is adapted to be movable in the axial or thrust direction, is pressed toward the opposite inside ring 10b from outside by a coil spring 16 inserted between the movable inside ring 11b and a rotary shaft 9.

Although the present invention has been described with reference to the several foregoing embodiments, it will be apparent to those skilled in the art that various changes and modifications may be made thereto without departing from the scope of the appended claims.

What is claimed is:

1. An apparatus for intermitting beams of light for use in a gas analyzer, characterized by that a rotary shaft of a chopper is supported by two ball bearings, an outside ring of one ball bearing being fixedly mounted on a bearing housing, and an outside ring or inside ring of another ball bearing being adapted to be movable in the thrust direction relative to said bearing housing or rotary shaft and movably energized in the thrust direction by an elastic member.

2. An apparatus for intermitting beams of light for use in a gas analyzer as set forth in claim 1, characterized by that said elastic member is a spring and the spring is inserted between said two ball bearings.

3. An apparatus for intermitting beams of light for use in a gas analyzer as set forth in claim 2, characterized by that said spring is provided outside a ball bearing which is not fixed.

4. In an apparatus for intermitting beams of light in a gas analyzer including a chopper mounted on a rotary shaft supported for rotation in a housing by first and second ball bearings which are spaced apart in an axial direction which is parallel to the axis of rotation of the rotary shaft, the improvement comprising:
   said first ball bearing including an outside ring fixedly mounted on said housing;
   said second ball bearing including a movable ring comprising one of an inside ring and an outside ring of said second ball bearing, said movable ring being slidable along said rotary shaft in said axial direction; and
   biasing means associated with said movable ring for biasing said movable ring in said axial direction so that play in said first and second ball bearings is reduced and modulation noise generated when a beam of light is intermitted by said chopper is reduced and measuring accuracy of said gas analyzer is improved.

5. The apparatus of claim 4, wherein said biasing means comprises a spring compressed between said movable ring and a corresponding ring of said first ball bearing.

6. The apparatus of claim 4, wherein said biasing means comprises a spring compressed between said movable ring and said housing.

7. The apparatus of claim 4, wherein said biasing means comprises a spring compressed between said movable ring and said rotary shaft.

8. The apparatus of claim 4, wherein said movable ring comprises said outside ring of said second ball bearing.

9. The apparatus of claim 4, wherein said movable ring comprises said inside ring of said second ball bearing.

10. The apparatus of claim 4, wherein said biasing means comprises a spring and a pair of spring seats, said spring being compressed between said spring seats.

11. The apparatus of claim 10, wherein said spring seats are engaged with said outside ring of said first ball bearing and said outside ring of said second ball bearing, said outside ring of said second ball bearing comprising said movable ring.

12. The apparatus of claim 10, wherein said spring seats are engaged with an inside ring of said first ball bearing and said inside ring of said second ball bearing, said inside ring of said second ball bearing comprising said movable ring.

13. The apparatus of claim 10, wherein said spring seats are engaged with said outside ring of said second ball bearing and a fixing ring secured to said housing, said outside ring of said second ball bearing comprising said movable ring.

14. The apparatus of claim 10, wherein said spring seats are engaged with said inside ring of said second ball bearing and a fixing ring secured to said rotary shaft, said inside ring of said second ball bearing comprising said movable ring.

* * * * *